United States Patent
Rokosky (10) Patent No.: US 10,084,909 B2
(45) Date of Patent: *Sep. 25, 2018

(54) SYSTEM AND METHOD FOR CONTROLLING FREE PHONE CALLS THROUGH AN INSTITUTIONAL PHONE SYSTEM

(71) Applicant: DSI-ITI, LLC, Reston, VA (US)

(72) Inventor: James P. Rokosky, Altoona, PA (US)

(73) Assignee: DSI-ITI, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,446

(22) Filed: Apr. 17, 2017

(65) Prior Publication Data

US 2017/0223181 A1    Aug. 3, 2017

Related U.S. Application Data

(63) Continuation of application No. 15/069,538, filed on Mar. 14, 2016, now Pat. No. 9,628,614, which is a
(Continued)

(51) Int. Cl.
*H04M 3/42*  (2006.01)
*H04M 3/38*  (2006.01)
(Continued)

(52) U.S. Cl.
CPC ........ *H04M 3/385* (2013.01); *H04L 63/0861* (2013.01); *H04M 3/2281* (2013.01);
(Continued)

(58) Field of Classification Search
CPC ............. H04M 15/00; H04M 15/8044; H04M 2215/745; H04M 2215/42; H04M 15/80;
(Continued)

(56) References Cited

U.S. PATENT DOCUMENTS 5,229,764 A   7/1993  Matchett et al.
5,274,695 A   12/1993 Green
(Continued)

OTHER PUBLICATIONS

"Cisco IAD2420 Series Integrated: Access: Devices Software Configuration Guide—Initial Configuration," Cisco Systems, accessed Sep. 23 2014, accessible at http://www..cisco.com/en/US/docs/routers/access/2400/2420/software/configuration/guide/init_cf.html.
(Continued)

*Primary Examiner* — Rasha Al Aubaidi
(74) *Attorney, Agent, or Firm* — Sterne, Kessler, Goldstein & Fox, P.L.L.C.

(57) ABSTRACT

A method of controlling free phone calls places from within a secured premises through an institutional phone system generally includes assigning a unique access identifier to an individual caller upon entry into the secured premises; receiving a destination number front the individual caller within the secured premises, the destination number being associated with a telephone located outside the secured premises; determining if the destination number is a per se free number, and, if the destination number is not determined to be a per se free number: receiving the unique access identifier from the individual caller; validating the unique access identifier; and, if the unique access identifier is valid, processing a telephone call to the destination number.

20 Claims, 2 Drawing Sheets

Related U.S. Application Data continuation of application No. 14/604,407, filed on Jan. 23, 2015, now abandoned, which is a continuation of application No. 13/615,693, filed on Sep. 14, 2012, now Pat. No. 8,942,361, which is a continuation of application No. 11/861,824, filed on Sep. 26, 2007, now Pat. No. 8,295,457.

(51) Int. Cl.
| | |
|---|---|
| H04L 29/06 | (2006.01) |
| H04M 15/00 | (2006.01) |
| H04M 3/22 | (2006.01) |
| H04M 3/493 | (2006.01) |
| H04W 12/06 | (2009.01) |

(52) U.S. Cl.
CPC ....... *H04M 3/42221* (2013.01); *H04M 3/493* (2013.01); *H04M 15/8044* (2013.01); *H04W 12/06* (2013.01); *H04M 2215/42* (2013.01)

(58) Field of Classification Search
CPC ..... H04M 15/43; H04M 15/44; H04W 12/06; H04W 12/08
USPC ............ 379/114.02, 114.01–114.05; 455/411
See application file for complete search history.

(56) References Cited

U.S. PATENT DOCUMENTS

| | | | |
|---|---|---|---|
| 5,473,671 A | 12/1995 | Partridge | |
| 5,485,507 A | 1/1996 | Brown et al. | |
| 5,502,759 A | 3/1996 | Cheng et al. | |
| 5,563,933 A | 10/1996 | August et al. | |
| 5,655,013 A | 8/1997 | Gainsboro et al. | |
| 5,717,743 A | 2/1998 | McMahan et al. | |
| 5,923,746 A | 7/1999 | Baker et al. | |
| 5,926,533 A | 7/1999 | Gainsboro | |
| 5,943,403 A | 8/1999 | Richardson et al. | |
| 6,052,454 A | 4/2000 | Kek et al. | |
| 6,064,963 A | 5/2000 | Gainsboro | |
| 6,084,967 A | 7/2000 | Kennedy et al. | |
| 6,104,922 A | 8/2000 | Baumann | |
| 6,160,903 A | 12/2000 | Hamid et al. | |
| 6,182,221 B1 | 1/2001 | Hsu et al. | |
| 6,213,391 B1 | 4/2001 | Lewis | |
| 6,219,439 B1 | 4/2001 | Burger | |
| 6,219,640 B1 | 4/2001 | Basu et al. | |
| 6,246,769 B1 | 6/2001 | Kohut | |
| 6,282,566 B1 | 8/2001 | Lee et al. | |
| 6,377,699 B1 | 4/2002 | Musgrave et al. | |
| 6,389,397 B1 | 5/2002 | Otto | |
| 6,574,317 B1 | 6/2003 | de Freitas | |
| 6,665,376 B1 | 12/2003 | Brown | |
| 6,668,045 B1 | 12/2003 | Mow | |
| 6,687,733 B2 | 2/2004 | Manukyan | |
| 6,788,772 B2 | 9/2004 | Barak et al. | |
| 6,810,480 B1 | 10/2004 | Parker et al. | |
| 6,819,219 B1 | 11/2004 | Bolle et al. | |
| 6,836,556 B1 | 12/2004 | Bromba et al. | |
| 6,950,508 B1 | 9/2005 | Griffiths | |
| 7,035,386 B1 | 4/2006 | Susen et al. | |
| 7,158,621 B2 | 1/2007 | Bayne | |
| 7,278,028 B1 | 10/2007 | Hingoranee | |
| 7,305,090 B1 | 12/2007 | Hayes et al. | |
| 7,494,061 B2 | 2/2009 | Reinhold | |
| 7,505,573 B2 | 3/2009 | Leonard | |
| 7,529,357 B1 | 5/2009 | Rae et al. | |
| 7,551,732 B2 | 6/2009 | Anders | |
| 7,848,510 B2 | 12/2010 | Shaffer et al. | |
| 7,853,243 B2 | 12/2010 | Hodge | |
| 7,881,446 B1 | 2/2011 | Apple et al. | |
| 7,899,167 B1 | 3/2011 | Rae | |
| 8,014,500 B2 | 9/2011 | Chou | |
| 8,050,393 B2 | 11/2011 | Apple et al. | |
| 8,295,446 B1 | 10/2012 | Apple et al. | |
| 8,295,457 B2 | 10/2012 | Rokosky | |
| 8,428,238 B2 | 4/2013 | Jain et al. | |
| 8,494,144 B2 | 7/2013 | Hodge | |
| 8,582,738 B1 | 11/2013 | Keiser | |
| 8,929,525 B1 | 1/2015 | Edwards | |
| 8,942,361 B2 | 1/2015 | Rokosky | |
| 9,106,789 B1 | 8/2015 | Shipman, Jr. et al. | |
| 9,426,303 B1 | 8/2016 | Edwards et al. | |
| 9,628,614 B2 | 4/2017 | Rokosky | |
| 9,699,304 B1 | 7/2017 | Hodge | |
| 9,769,310 B2 | 9/2017 | Hodge | |
| 9,794,399 B1 | 10/2017 | Hodge | |
| 2002/0034940 A1 | 3/2002 | Takae et al. | |
| 2002/0042879 A1 | 4/2002 | Gould et al. | |
| 2002/0080751 A1 | 6/2002 | Hartmaier | |
| 2002/0177433 A1 | 11/2002 | Bravo et al. | |
| 2003/0002639 A1 | 1/2003 | Hule | |
| 2003/0076940 A1 | 4/2003 | Manto | |
| 2003/0086546 A1 | 5/2003 | Falcone et al. | |
| 2003/0142853 A1 | 7/2003 | Waehner et al. | |
| 2004/0029564 A1 | 2/2004 | Hodge | |
| 2004/0213396 A1 | 10/2004 | MacNamara et al. | |
| 2005/0043014 A1 | 2/2005 | Hodge | |
| 2005/0052993 A1* | 3/2005 | Hanks ................. H04L 41/0213 370/229 |
| 2005/0102371 A1 | 5/2005 | Aksu | |
| 2005/0123111 A1 | 6/2005 | Philbin et al. | |
| 2005/0123113 A1 | 6/2005 | Horn | |
| 2006/0224456 A1 | 10/2006 | Walker et al. | |
| 2006/0277256 A1 | 12/2006 | Tiruthani et al. | |
| 2007/0041545 A1 | 2/2007 | Gainsboro | |
| 2007/0047734 A1 | 3/2007 | Frost | |
| 2007/0049248 A1 | 3/2007 | Dawson et al. | |
| 2007/0071206 A1 | 3/2007 | Gainsboro et al. | |
| 2007/0140448 A1 | 6/2007 | Lin et al. | |
| 2007/0172155 A1 | 7/2007 | Guckenberger | |
| 2008/0057976 A1 | 3/2008 | Rae et al. | |
| 2008/0102746 A1 | 5/2008 | Amador et al. | |
| 2008/0293390 A1 | 11/2008 | Yang et al. | |
| 2008/0304438 A1 | 12/2008 | Stille | |
| 2009/0042541 A1 | 2/2009 | Yi et al. | |
| 2009/0046839 A1 | 2/2009 | Chow et al. | |
| 2009/0060161 A1 | 3/2009 | Mertz et al. | |
| 2009/0080629 A1 | 3/2009 | Rokosky | |
| 2009/0241201 A1 | 9/2009 | Wootton et al. | |
| 2009/0281904 A1 | 11/2009 | Pharris | |
| 2010/0111274 A1 | 5/2010 | Bayne | |
| 2010/0151820 A1 | 6/2010 | Mulherin et al. | |
| 2010/0189228 A1 | 7/2010 | Seyfetdinov | |
| 2010/0197293 A1 | 8/2010 | Shem-Tov | |
| 2011/0077022 A1 | 3/2011 | Scovill | |
| 2011/0196753 A1 | 8/2011 | Hodgdon et al. | |
| 2011/0207454 A1 | 8/2011 | Garg et al. | |
| 2011/0258680 A1 | 10/2011 | Rathus et al. | |
| 2012/0072975 A1 | 3/2012 | Labrador et al. | |
| 2012/0099714 A1 | 4/2012 | Hodge | |
| 2012/0262271 A1 | 10/2012 | Torgersrud et al. | |
| 2012/0281058 A1 | 11/2012 | Laney et al. | |
| 2012/0331527 A1 | 12/2012 | Walters et al. | |
| 2013/0010943 A1 | 1/2013 | Rokosky | |
| 2013/0027504 A1 | 1/2013 | Zhang | |
| 2013/0058469 A1 | 3/2013 | Gongaware et al. | |
| 2013/0194377 A1 | 8/2013 | Humphries | |
| 2013/0225129 A1 | 8/2013 | Norbisrath et al. | |
| 2013/0263227 A1 | 10/2013 | Gongaware et al. | |
| 2013/0267204 A1 | 10/2013 | Schultz et al. | |
| 2014/0104429 A1 | 4/2014 | Ward et al. | |
| 2014/0171037 A1 | 6/2014 | Park | |
| 2014/0247926 A1 | 9/2014 | Gainsboro et al. | |
| 2014/0266669 A1 | 9/2014 | Fadell et al. | |
| 2014/0269366 A1 | 9/2014 | Torgersrud et al. | |
| 2014/0278212 A1 | 9/2014 | Torgersrud et al. | |
| 2014/0302829 A1 | 10/2014 | Won | |
| 2014/0329514 A1 | 11/2014 | Meriaz et al. | |
| 2014/0334610 A1 | 11/2014 | Hangsleben | |
| 2014/0378149 A1 | 12/2014 | Lau et al. | |
| 2015/0044983 A1 | 2/2015 | Nasir et al. | |
| 2015/0201072 A1 | 7/2015 | Rokosky | |

(56) References Cited

U.S. PATENT DOCUMENTS

| | | |
|---|---|---|
| 2015/0229770 A1 | 8/2015 | Shuman et al. |
| 2015/0244706 A1 | 8/2015 | Grajek et al. |
| 2015/0319612 A1 | 11/2015 | Hodge |
| 2015/0347734 A1 | 12/2015 | Beigi |
| 2016/0078281 A1 | 3/2016 | Gongaware et al. |
| 2016/0093305 A1 | 3/2016 | Chang |
| 2016/0094815 A1 | 3/2016 | Scalisi |
| 2016/0198042 A1 | 3/2016 | Rokosky |
| 2016/0125343 A1 | 5/2016 | O'Dea et al. |
| 2016/0269551 A1 | 9/2016 | Gongaware et al. |
| 2016/0300576 A1 | 10/2016 | Karpey et al. |
| 2016/0379328 A1 | 12/2016 | Smith |
| 2017/0041787 A1 | 2/2017 | Hodge |
| 2017/0041788 A1 | 2/2017 | Hodge |
| 2017/0134468 A1 | 5/2017 | Torgersrud et al. |
| 2017/0149962 A1 | 5/2017 | Hodge |
| 2017/0294063 A1 | 10/2017 | Hodge |
| 2017/0324721 A1 | 11/2017 | Kormann et al. |
| 2018/0007194 A1 | 1/2018 | Hodge |

OTHER PUBLICATIONS

"Criminal Calls: A Review of the Bureau of Prisons' Management of Inmate Telephone Privileges,:" USDOJ/OIG Special Report, Table of Contents, 1999, available at http://www.justice.gov/oig/special/9908/.

"PacketCable™ Audio/Video Codecs Specification," Cable Television Laboratories, Inc, Ser. No. PKT-SP-CODEC-WS-640113 (2004).

"The AutoEDMS Document Management and Workflow System: An Overview of Key Features, Functions and. Capabilities," ACS Software, May 2003.

"Global Call API for Linux and Windows Operating SySterns," Intel Dialogic Library Reference, Dec. 2005. (3 parts).

Auckenthaler, et al. "Speaker-Centric Score Normalization and Time Pattern Analysis for Continuous Speaker Verification," International Conference Acoustics, Speech, and Signal Processing (ICASSP), vol. 2, Jun. 2000, pp. 1065-1068.

Beigi, H., "Challenges of Large-Scale Speaker Recognition," 3rd European Cooperation in the Field of Scientific and Technical Research Conference, Nov. 4, 2005.

Carey, et al., "User Validation for Mobile Telephones," Internationa Conference on Acoustics, Speech and Signal Processing (ICASSP), vol. 2, Jun. 2000, pp. 1093-1096.

Definition of "constantly", The American Heritage Oictionary, 4th Ed., (2002); p. 306.

Fleischman, E., "Advanced Streaming Format (ASF) Specification," Microsoft Corporation (Jan. 9, 1998).

Furui, S., "50 Years of Progress in Speech and Speaker Recognition Research," ECTI Transactions on Computer and Information Technology, vol. 1, No. 2, Nov. 2005, pp. 64-74.

International Search Report and Written Opinion directed to International Patent Application No. PCT/US2016/062193, dated Apr. 21, 2017; 12 pages.

International Search Report and Written Opinion directed to International Patent Application No. PCT/US2017/027028, dated Aug. 25 2017; 31 pages.

Juang, et al., "Automatic Speech Recognition—A Brief History of the Technology Development," Oct. 8, 2014.

Kinnunen et al., "Real-Time Speaker Identification and Verification," IEEE Transactions on Audio, Speech, and Language Processing, vol. 14, No. 1, Jan. 2006, pp. 277-288.

Kozamernik, F., "Media Streaming over the Internet—an overview of delivery technologies," EBU Technical Review (Oct. 2002).

*Microsoft Computer Dictionary*, Fifth Edition, Microsoft Computer Press: Redmond, WA, 2002.

Newton, H. Newton's Telecom Dictionary (18th ed. 2002); p. 655.

Original Specification as-filed Aug. 26, 2005, in U.S. Appl. No. 11/212,495 to Frost.

Original Specification as-filed Jul. 22, 2005, in U.S. Appl. No. 11/187,423 to Shaffer.

Pollack, et al., "On the Identification of Speakers by Voice," The Journal of the Acoustical Society of America, vol. 26, No. 3, May 1954.

Prosecution History of U.S. Appl. No. 11/005,816, filed Dec. 7, 2004.

Prosecution History of U.S. Appl. No. 11/480,258, filed Jun. 30, 2006.

Ross, et al., "Multimodal Biometrics: An Overview," Proc. of 12th European Signal Processing Conference (EUSIPCO), Vienna, Austria, Sep. 2004, pp. 1221-1224.

Shearme, et al., "An Experiment Concerning the Recognition of Voices," Language and Speech, vol. 2, No. 3., Jul./Sep. 1959.

Walden, R., "Performance Trends for Analog-to-Digital Converters," IEEE Communications Magazine, Feb. 1999.

Notice of Allowance for U.S. Appl. No. 11/861,824, dated Jun. 22, 2012; 5 pages.

Non-Final Office Action for U.S. Appl. No. 11/861,824 dated Dec. 12, 2011; 10 pages.

Non-Final Office Action for U.S. Appl. No. 11/861,824, dated Dec. 23, 2010; 9 pages.

Notice of Allowance for U.S. Appl. No. 13/615,693, dated Sep. 24, 2014; 5 pages.

Non Final Office Action for U.S. Appl. No. 13/615,693, dated Mar. 12, 2014; 10 pages.

Non-Final Office Action for U.S. Appl. No. 13/615,693, dated Jan. 16, 2013; 8 pages.

Final Office Action for U.S. Appl. No. 13/615,693, dated Jul. 16, 2014; 6 pages.

Final Office Action for U.S. Appl. No. 13/615,693, dated Nov. 5, 2013; 9 pages.

Prosecution History of U.S. Appl. No. 12/002,507, filed Dec. 17, 2007.

Defendant's Opening Claim Construction Brief, *Global Tel\*Link Corporation v. Securus Technologies, Inc.*, Case No. 3:14-cv-0829-K (N.D. Tex.), filed Nov. 19, 2014.

Defendant's Responsive Claim Construction Brief, *Global Tel\*Link Corporation v. Securus Technologies, Inc.*, Case No. 3:14-cv-0829-K (N.D. Tex.), filed Dec. 10, 2014.

Non-Final Office Action for U.S. Appl. No. 14/604,407, dated May 15, 2015; 10 pages.

Final Office Action directed to U.S. Appl. No. 14/604,407 dated Nov. 25, 2015; 11 pages.

International Search Report and Written Opinion of the International Searching Authority directed to related International Patent Application No. PCT/US2017/068189, dated Jan. 26, 2018; 10 pages.

\* cited by examiner

SYSTEM AND METHOD FOR CONTROLLING FREE PHONE CALLS THROUGH AN INSTITUTIONAL PHONE SYSTEM

CROSS-REFERENCE TO RELATED APPLICATIONS

This application is a Continuation Application of U.S. application Ser. No. 15/069,538, filed Mar. 14, 2016, which is a Continuation Application of U.S. application Ser. No. 14/604,407, filed Jan. 23, 2015, which is a Continuation Application of U.S. application Ser. No. 13/615,693, filed Sep. 14, 2012, now U.S. Pat. No. 8,942,361, which is a Continuation Application of U.S. application Ser. No. 11/861,824, filed Sep. 26, 2007, now U.S. Pat. No. 8,295,457, both of which are incorporated herein by reference in their entirety.

BACKGROUND OF THE INVENTION

Field of the Invention

The instant invention relates generally to telecommunication services that are provided through an institutional phone system, such as the phone system in a correctional institution. In particular, the instant invention relates to a system and method for managing and monitoring free phone calls placed through an institutional phone system.

Background Art

In the correctional industry, inmate phone calls are often controlled through sophisticated call processing equipment. The call processing equipment controls various aspects of the use of the telephone in order to meet a variety of competing concerns including security, accessibility, and revenue generation. One objective of an inmate telephone system is to maximize the security of the system and to also maximize the revenue produced by the system while providing the inmate with accessibility to reasonable telecommunication services as authorized by the institution.

One feature that inmate phone systems may provide is the ability to maintain lists of allowed or blocked phone numbers by inmate, by class of inmate, or globally for a facility. Such lists allow the institution to regulate who an inmate can and cannot call. As an example of a list applied to a specific inmate, an inmate may be allowed to call his wife, but may not be allowed to call a co-defendant. As an example of a global list, all inmates may be allowed to call the local public defender's office, but may be disallowed from calling local judges. This feature balances the concern for security (e.g., disallowing calls to victims, witnesses and judges) with the concern of allowing an inmate with accessibility for legally mandated purposes (e.g., calls to the public defender) or personal reasons (e.g., calls to family members).

Another feature that an inmate telephone system may provide is the ability to monitor and record calls. This feature addresses the security concerns of the facility by allowing internal investigators to monitor what is occurring inside the institution and among the inmate population. This feature address the security concerns of society generally by allowing external investigators access to phone conversations that relate to the investigation of activities external to the institution.

Another feature that an inmate telephone system may provide is the recording and retrieval of call detail information (e.g., the identity of the caller, the called party, the time of the call, and the like). This feature is important to addressing the concerns of security and revenue. Call detail records allow investigators to research data such as the inmate that placed the call, the phone number that was dialed, what time the call was placed, and how long the conversation lasted. This research can often he performed by call, by inmate, by called number, by time of call and by any combination thereof. Investigators can analyze this data to determine patterns and connections between people and places that are relevant to internal and external investigations. Call detail records are also the fundamental data required for billing calls and managing revenue.

Another feature that an inmate telephone system may provide is the ability to alert and/or notify an investigator of a call of interest. This feature allows an investigator to be notified when a specific inmate makes a phone call, when a specific phone number is dialed, or a combination thereof. This feature addresses the both internal and external security needs by immediately alerting an investigator when a person or pattern of interest is identified and allowing the investigator to immediately monitor the call, review the call details, review the call recording, or any combination thereof, for example to gather intelligence.

A function of substantially all inmate phone systems is to enable the billing of phone calls. Inmate telephone systems provide different methods for inmates to place and pay for calls. For example, call payment options may include collect calling (wherein the called party pays for the call), debit calling (wherein the inmate pays for the call with funds from their commissary account), pre-paid calling cards, and pre-paid accounts associated with a called number.

BRIEF SUMMARY OF THE INVENTION

While the inmate phone systems and features described above address, to a certain extent, the balance between security, accessibility, and revenue, it is desirable to improve control over the use of the phones in the secured premises by inmates or offenders that have not yet been processed into the phone system and issued their identifier (e.g., a TID). This scenario typically occurs in the booking or intake area of a facility, but can exist in other areas of an institution where inmates are held prior to being fully inprocessed. Arrestees or inmates may remain in the intake area of an institution for hours or more, during which time they remain unprocessed into the phone system. In many jurisdictions, inmates have a right to make one phone call to a family member, a lawyer, or an organization. The "one phone call" that an inmate is granted is typically provided at no cost while the inmate is waiting to be inprocessed, before a TID or other identifier has been issued to the inmate for use with the institutional telephone system.

Inmate phone providers often accommodate the "one phone call" requirement by allowing all calls made from phones in the intake or booking area to be made at no charge to the inmate or called party and without any TID or other identifier being provided by the inmate. This substantially unrestricted access, however, negatively impacts security and revenue. Though inmates are often permitted a limited number of free phone calls upon arrest and intake to a correctional institution, the reality is that inmates often have unrestricted access to the free telephones while they remain in the intake area awaiting processing. This situation exists because the alternative requires correctional officers to physically control and regulate inmate access to and use of the free telephone. In most institutions, it is not feasible for an officer to provide this level of control, as the officers are fully tasked with processing inmates and maintaining physical security of the intake area. Further, because the inmate phone provider is typically responsible for absorbing the operating cost of carrying the free booking calls, institutional managers (e.g., superintendents and wardens) are often unwilling to commit officer resources to provide physical control over the free phones even if resources are otherwise sufficient to do so. As a result, both the inmate phone provider and the institution lose significant revenue as inmates make unrestricted free phone calls while waiting to be processed. This loss of revenue is relatively easy to quantify.

Less measurable are the negative effects that uncontrolled access to inmate calling services has on security. With unlimited free call access while awaiting processing, arrestees can use the inmate calling system not only to make permitted calls (e.g., to an attorney or family member), but also to make impermissible calls (e.g., to a witness or victim). Further, without the use of some form of authentication or identification on a free phone call, investigators lose the ability to utilize the investigative tools discussed above (e.g., searching call recordings, analyzing call details of a specific inmate, discovering relationships between inmates and called telephone numbers), and many other investigative capabilities.

It is an object of the present invention to enable an inmate telephone system to provide free calls.

Implementation of many of the features discussed above relies upon the ability to identify the inmate using the phone. In order to implement features specific to the inmate using the phone, the phone system must provide some way to authenticate and/or identify the user. This can be done, for example, through the use of a Telephone ID (TID), a biometric, or other authentication technique.

It is an object of the invention disclosed herein to improve the balance between security, revenue, and accessibility in connection with free calls made using an institutional telephone system.

While the booking facility is often located within the corrections facility, it is contemplated that the booking facility may also be located offsite. In either situation, the booking facility is preferably a secured premises with controlled ingress and egress.

The present invention provides a method of controlling free phone calls placed from within a secured premises through an institutional phone system. This method generally includes the steps of: assigning a unique access identifier to an individual caller upon entry into the secured premises; receiving a destination number from the individual caller within the secured premises, the destination number being associated with a telephone located outside the secured premises; determining if the destination number is a per se free number, and, if the destination number is not determined to be a per se free number: receiving the unique access identifier from the individual caller; validating the unique access identifier; and if the unique access identifier is valid, processing a telephone call to the destination number. Optionally, the method includes: defining a database of per se free numbers, wherein the step of determining if the destination number is a per se free number includes checking the database of per se free numbers to determine if the destination number matches an entry in the database of per se free numbers. In some embodiments of the invention, the step of validating the unique access identifier includes: comparing the unique access identifier to a database of active access identifiers to determine whether the unique access identifier matches an entry in the database of active access identifiers; and determining whether one or more free calls remain authorized for the unique access identifier.

The present invention also provides a method of controlling free phone calls placed using an institutional telephone system, generally including the following steps: storing a database of unique access identifiers, the database of unique access identifiers including a plurality of active access identifiers; receiving an access identifier from a caller attempting to place a free call using the institutional telephone system; checking the database of unique access identifiers to determine if the received access identifier matches one of the plurality of active access identifiers; and if the received access identifier matches one of the plurality of active access identifiers, permitting the caller to place a free call using the institutional telephone system. Typically, the plurality of active access identifiers includes those unique access identifiers currently authorized for one or more free calls (e.g., unexpired in-service access identifiers with one or more free calls remaining).

Also disclosed herein is a system for controlling free phone calls placed through an institutional phone system. The system includes: at least one telephone device; an access identifier database, the access identifier database including a plurality of active access identifiers; an access identifier input device coupled to the at least one telephone device; and a free call control processor that determines whether a destination number input at the at least one telephone device is a per se free number and, if the destination number is not a per se free number, validates an access identifier input at the access identifier input device against the access identifier database. The access identifier input device may be a telephone keypad (e.g., the keypad on the at least one telephone device). Alternatively, the access identifier input device may be a biometric input device (e.g., a fingerprint scanner).

The present invention advantageously provides functionality beyond the functionality provided by many inmate phone providers. The invention disclosed herein provides a method to control the number of free calls made by an inmate that is awaiting processing in the phone system. In addition, the present invention advantageously provides a mechanism for investigators to identify the inmate participating in a free call for purposes of analysis and investigation. The present invention thereby addresses the shortcomings of existing inmate phone systems, leading to increased security and revenue, without adversely impacting the reasonable access of an incarcerated individual to telecommunications services.

The foregoing and other aspects, features, details, utilities, and advantages of the present invention will be apparent from reading the following description and claims, and from reviewing the accompanying drawings.

DETAILED DESCRIPTION OF THE INVENTION

The present invention provides a method and system for controlling free telephone calls made using an institutional telephone system. The term "institutional telephone system" (or "institutional phone system") as used herein refers to a telephone system installed in an environment wherein it is desirable to control or regulate telephone usage, including, without limitation, correctional facilities, military installations, hospitals, schools, business offices, and government offices. Though the present invention will be described in connection with the corrections industry, and in particular in connection with a telephone system that permits free calls in a correctional facility's initial holding and/or inprocessing area, it should be understood that the invention is not so limited. One of ordinary skill in the art will appreciate that the principles disclosed herein may be employed to good advantage in any telephone system where it is desirable to regulate or control the placement of telephone calls.

The free call control system according to the present invention may be implemented as an enhancement to an inmate telephone system, such as the ITI Offender Communication System. Of course, the free call control system disclosed herein may also be implemented in connection with other inmate telephone systems, including, but not limited to, Global Tel*Link's LazerPhone system, Securus Technologies' Secure Call Platform, Pay-Tel Communications, Inc.'s inmate telephone system, and PCS Corporation's Inmate Communications Systems. One of ordinary skill in the art will generally appreciate the functions and capabilities of an inmate telephone system. Thus, inmate telephone systems, such as those listed above, are described herein only to the extent necessary to understand the present invention.

Figure 1:
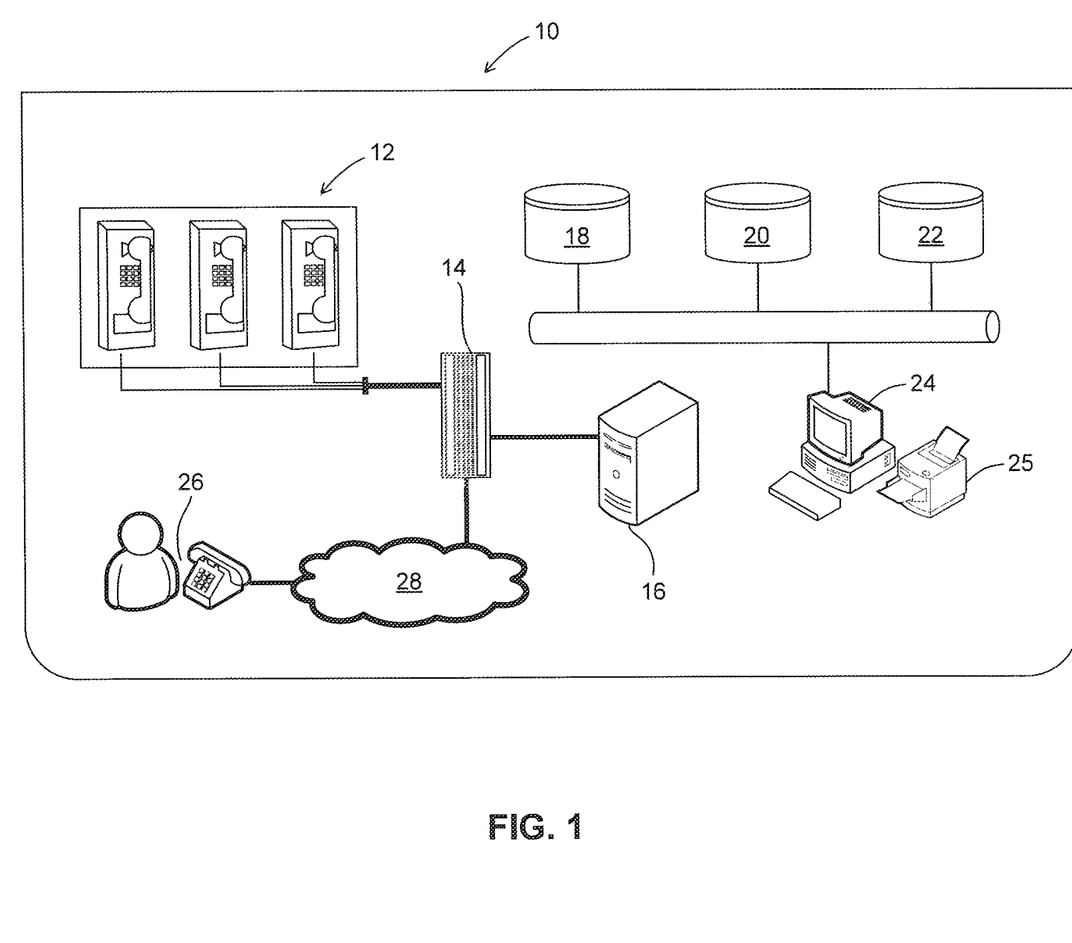
FIG. 1 is an overview of an inmate telephone system including free call control functionality according to an embodiment of the present invention.

FIG. 1 is a schematic illustration of a free call control system 10, for example an inmate telephone system including, free call control functionality. The free call control system generally includes one or more telephone devices 12 (referred to herein as "free phones"), which are coupled to one or more phone system servers 16, for example through connection block 14. One of ordinary skill in the art will appreciate that telephone devices 12 may be coupled to phone system servers 16 through other means, such as hard-wiring, without departing from the spirit and scope of the present invention. Only one phone system server 16 is illustrated in FIG. 1 for the sake of clarity.

The phone system server 16 is coupled to one or more databases, such as an inmate database 18, a configuration database 20, and an access ID database 22. The term "database" as used herein includes, but is not limited to, relational databases in which a plurality of data sets are associated with each other and stored, preferably as one or more records. The database may be stored in a single medium or may be stored in multiple media interconnected by a network. The term "database" also includes any collection of related data organized and stored in an electronic format (e.g., a delimited ASCII file).

Free call control system 10 may also include one or more workstations 24 coupled to one or more printers 25. As described in further detail below, workstations 24 and printers 25 may be used to issue free call access IDs to individuals.

A caller using one of the free telephones 12 may be connected to a called party 26 through network 28, which may be the PSTN, a cellular network, VOIP, or any other telephony network technology.

Free call control system 10 utilizes a set of configuration items to control behavior of the system, such as the number of free calls that an individual may place. Configuration items may also include the length of an access ID, the number of free calls that an access ID may be used to complete, the length of time that an access ID is valid after it is issued, the length of time that an access ID is valid after its first use, the length of time after which an expired access ID may be reused (e.g., recycle time), and the like. Thus, configuration items facilitate adapting the free call control system 10 to the various operational rules of the facility in which free call control system 10 is installed.

Preferably, configuration items are stored in configuration database 20. One of ordinary skill in the art will appreciate, however, that configuration items may be stored in a variety of other ways, such as in a properties file or an initialization file, without departing from the spirit and scope of the invention.

Free call control system 10 also typically contains a database 22 of access IDs. The term "access ID" refers to a unique identifier that can be recognized by the free call control system 10 to control the number of free calls being made by an individual. Access IDs may also be stored for future reference, for example to aid in identifying the individual that placed a particular call. As described above, it is contemplated that the syntax for access IDs, expiration of access IDs, recycle time of access IDs, and the like may be governed by configuration items stored in configuration database 20. Of course, database 22 of access IDs may include only currently valid/active access IDs (e.g., unexpired, in-service access IDs with free calls remaining), or all access IDs, both valid/active/in-service and invalid/expired/out-of-service. Each access ID stored within database 22 may be associated with additional information, such as a validity/invalidity (or active/expired) flag, the number of free calls remaining on the access ID, the time until the access ID expires, the time at which the access ID expires, and the like.

One suitable method of generating access IDs is to generate an access code as a random alphanumeric sequence of preset length (e.g., a six digit number). Depending on the configuration of the free call control system 10, this system-generated access ID may be set to expire within a preset time period after it is generated, a preset time period after it is first used to make a free call, after a preset number of free calls are placed using the access ID, or some combination thereof the sooner of 30 minutes after first use or 3 free phone calls). Moreover, the configuration of the free call control system 10 may provide that an expired access ID may be reused after it has been inactive for a preset period of time (e.g., after a period of 30 days).

System-generated access IDs are preferably produced on a printed output that may be provided to the arrestee for use in placing one or more free calls. This concept is analogous to providing an arrestee with a quarter for a payphone to place one call, in that it facilitates having a finite limit on the number of free calls that can be placed, but provides for much greater flexibility and control over the process. In some embodiments of the invention, the workstation 24 and attached printer 25 are used to print free call access ID cards for distribution to arrestees. These free call access ID cards may be provided on a two part form containing the access ID and, in some embodiments of the invention, instructions for using the telephone 12. One part of the form containing the access ID (and, if present, the instructions) can be given to the arrestee, while the other part of the form containing the access ID can be attached to the arrestee's intake record to aid in identifying and searching calls made by the arrestee (e.g., to facilitate identification of the arrestee that possessed a particular access ID during a particular time frame). If desired, the access ID can also be transferred to the inmate phone system (or, alternatively, to an offender management system) for the purpose of enabling the inmate-related security and investigation features of an inmate phone system listed above. For example, the access ID can be associated with the inmate's record in the inmate phone system and/or offender management system as an additional item of data by which the inmate's telephone calls may be searched.

As an alternative to system-generated access IDs, access IDs may be accepted as unique numbers from an external system, such as the arrest number from a police records management system, provided, of course, that the externally-generated identifier is unique.

In still other embodiments of the invention, a biometric, such as a voiceprint or a fingerprint, may be used as the access ID. If a biometric is being used as the access ID, a configuration item may be provided that "resets" the number of free calls allowed to the access ID after a preset period of time. This allows for an individual who is re-arrested to receive additional free calls upon re-arrest.

Of course, it is also within the spirit and scope of the present invention to combine multiple forms of access ID (e.g., requiring both a system-generated access ID and a biometric).

The free call control system 10 may also be coupled to a database 18 of inmate or arrestee information. One of ordinary skill in the art will appreciate that this database 18 may be contained within the free call control system 10, within an inmate telephone system, within an offender management system, or any combination thereof. The inmate database 18 may contain, for example, identification and demographic data about inmates that have used the phone system. The inmate database 13 contemplated by the present invention is typically populated at some point after the inmate has used the phone system to place one or more free calls and the inmate has been enrolled into the inmate telephone system (or, alternatively, into an offender management system). It is also within the spirit and scope of the present invention, however, to populate the inmate database 18 prior to use of the telephones 12 by the inmates (e.g., during initial booking).

In embodiments where the free call control system 10 is associated with an inmate telephone system and/or offender management system, it is contemplated that the access ID may be associated with an inmate's record after the inmate has ultimately been enrolled into the inmate telephone system and/or offender management system. Thus, any call records and recordings of any calls made by the inmate using the free call access ID may be merged to the inmate's record in the inmate telephone system or offender management system. This advantageously incorporates all inmate calls under one telephone ID (TID), Whether placed before or after enrollment into the inmate telephone system and/or offender management system, such that all calls ever placed by the inmate are readily available through the security and investigative tools that may be provided by the inmate phone system and/or offender management system.

Phone system server 16 includes a free call control processor. The term "processor" as used herein refers to a computer microprocessor and for a software-program (e.g., a software module or separate program) that is designed to be executed by one or more microprocessors running on one or more computer systems. The free call control processor processes free calls in accordance with the present invention.

Figure 2:
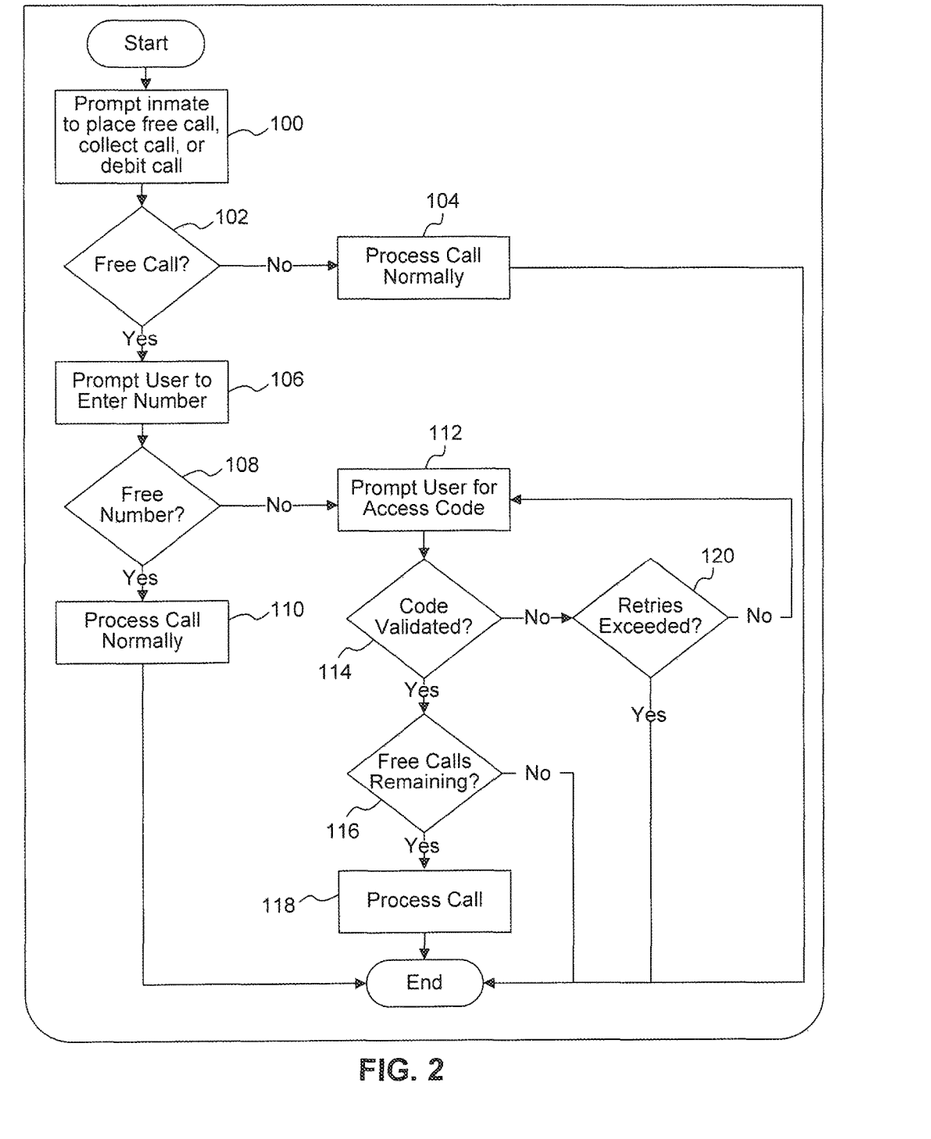
FIG. 2 is a flowchart that illustrates one method of free call processing according to the present invention.

One method of processing free calls will be described in connection with the flowchart of FIG. 2. In step 100, the free call Control processor receives an input from the caller initiating the call using one of the plurality of free phones 12 to determine if a free call is being requested, or if a collect or debit call is being requested instead. If the Caller has not requested k free call, the "NO" exit is taken from decision block 102, and the call is processed normally in step 104.

If the caller has requested to make a free call, the "YES" exit is taken from decision block 102, and the caller is prompted to input the destination number in step 106. The destination number is typically associated with a telephone located outside the secured premises. In decision block 108, the destination number is checked to determine if it is always allowed to be placed for free (a "per se free" number), such as a call to the public defender or to a local bail bondsman. If the destination number is per se free, the "YES" exit is taken from decision block 108 and the call is processed normally in step 110.

The free call control system 10 may utilize a free call database of per se free numbers. For example, a system administrator may define a free call database of phone numbers that are pre-approved as free calls, including, for example, an approved attorney's phone number, a legal aid phone number, and the like. Preferably, the numbers used to populate the free call database are associated with telephones located outside the secured premises from which the inmates make their calls. One of ordinary skill in the art will appreciate that this free call database may be contained within the free call control system 10, within an inmate telephone system, within an offender management system, or any combination thereof. It should also be appreciated that the database of per se free numbers may be included in configuration database 20. The free call database may then be accessed to see if the number requested to be dialed is contained within the pre-established list of per se free numbers.

If the number is not per se free (e.g., it is not contained in the free call database), the "NO" exit is taken from decision block 108 and the caller is prompted to enter a free call access code in step 112. As described above, the free call access code may be a system-generated access ID, another access ID, a biometric, or a combination thereof.

In decision block 114, the access code is validated. That is, the input access code is checked against access codes in the access ID database 22. If the input access code is valid (e.g., it matches an active, in-service access ID in the database 22), the "YES" exit is taken from decision block 114, and the access code is checked to determine whether free calls remain (e.g., whether the input access code complies with a configuration item stored in configuration database 20) in decision block 116. If free calls remain, the "YES" exit is taken from decision block 116, and the free call is processed in step 118 (e.g., the caller is connected to the called party 26 via telephony network 28). If all free calls have been exhausted, the "NO" exit is taken from decision block 116, and the process ends.

If the input access code is invalid (e.g., it does not match an active, in-service access ID in the database 22), the "NO" exit is taken from decision block 114, and, in decision block 120, the system determines whether the caller is permitted to retry entry of the access code. It should be understood that the maximum permissible number of retries may be provided as a configuration item stored in configuration database 20. If further retries remain, the "NO" exit is taken from decision block 120, and the process returns to step 112. If no further retries remain, the "YES" exit is taken from decision block 120, and the process ends.

Although several embodiments of this invention have been described above with a certain degree of particularity, those skilled in the art could make numerous alterations to the disclosed embodiments without departing from the spirit or scope of this invention. For example, though the present invention has been described in connection with a single phone system server 16 including a single free call processor, the methods described above may be executed by one or more computer systems, including suitable input, output, and storage devices or interfaces, and may be software implemented (e.g., one or more software programs or modules executed by one or more computer systems of processors), hardware implemented (e.g., a series of instructions stored in one or more solid state devices), or a combination of both. The computer may be a conventional general purpose computer, a special purpose computer, a distributed computer (such as two physically-separated computers that are linked via an intranet or the Internet), or any other type of computer. Further, the computer may comprise one or more processors, such as a single central processing unit or a plurality of processing units, commonly referred to as a parallel processing environment.

Therefore, it is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for managing telephone calls placed by a pre-processed caller, comprising:
    a biometric sensor configured to capture a biometric sample from the pre-processed caller;
    a database that stores the biometric sample as a biometric access identification (ID), the biometric access ID being a fingerprint obtained from the pre-processed caller, wherein the biometric access ID is associated in the database with:
        a flag that is set to "active" or "inactive";
        a first number of calls that defines a number of calls made by the pre-processed user, the first number of calls being preset to an initial value of zero; and
        a second number of calls that defines a maximum number of calls permitted by the pre-processed caller; and
    processing circuitry configured to:
        receive a request to process a call from the pre-processed caller;
        obtain a fingerprint from the pre-processed caller;
        compare the fingerprint to the stored biometric access ID; and
        process the call when the obtained fingerprint matches the stored biometric access ID and the flag is set to "active", the processing including:
            comparing the first number of calls to the second number of calls;
            connecting or denying the call based on the comparing.

2. The system of claim 1, wherein the processing circuitry is further configured to set the flag to "inactive" after the flag has been set to "active" for a predetermined amount of time.

3. The system of claim 1, wherein the processing circuitry is further configured to:
    increment the first number of calls by one in response to processing the call; and
    set the flag to "inactive" after the first number of calls is equal to the second number of calls.

4. The system of claim 3, wherein the processing circuitry is further configured to reset the first number of calls to zero after a pre-determined amount of time.

5. The system of claim 1, wherein the processing circuitry is further configured to set the flag to 'active' upon a first call attempt by the pre-processed caller after the biometric access ID been associated with the pre-processed caller.

6. The system of claim 1, wherein the system further comprises a call recording database, and the processing circuitry is further configured to:
    record the call, wherein the call is stored in the call recording database; and
    associate the recorded call with the biometric access ID.

7. The system of claim 1, wherein the system further comprises a free call database that stores a list of phone numbers that do not require authentication, and the processing circuitry is further configured to:
    determine whether the call is for a telephone number matches an entry in the list of phone numbers stored in the free call database; and
    process the call when the telephone number matches the entry in the list of phone numbers.

8. A method for managing telephone calls placed by a pre-processed caller associated with a biometric access identification (ID), comprising:
    capturing a biometric sample from the pre-processed caller using a biometric sensor;
    storing the biometric sample as the biometric access ID in association with:
        a first number of calls that defines a number of calls made by the pre-processed caller, the first number of calls being preset to an initial value of zero;
        a second number of calls that defines a maximum number of calls permitted by the pre-processed caller; and
        a flag that is set to "active" or "inactive";
    receiving a request to process a call from the pre-processed caller;
    obtaining a fingerprint from the pre-processed caller;
    comparing the fingerprint to the stored biometric access ID; and
    processing the call in response to determining that the obtained fingerprint matches the biometric access ID, that the flag associated with the biometric access ID is set to "active," and that first number of calls is less than the second number of calls.

9. The method of claim 8, further comprising setting the flag to "inactive" after the flag has been set to "active" for a predetermined amount of time.

10. The method of claim 8, the method further comprising:
    incrementing the first number of calls by one in response to processing the call; and
    setting the flag to "inactive" after the first number of calls is equal to the second number of calls.

11. The method of claim 10, further comprising resetting the first number of calls to zero after a pre-determined amount of time.

12. The method of claim 8, further comprising setting the flag to 'active' upon a first call attempt by the pre-processed caller after the biometric access ID been associated with the pre-processed caller.

13. The method of claim 8, further comprising:
    recording the call, wherein the call is stored in a call recording database; and
    associating the recorded call with the biometric access ID.

14. The method of claim 8, further comprising:
    determining whether the call is for a telephone number matches an entry in a list of phone numbers stored in a free call database; and
    processing the call when the telephone number matches the entry in the list of phone numbers.

15. A non-transitory computer program storage device tangibly embodying a program of instructions executable by at least one machine to perform a method for managing telephone calls placed by a pre-processed caller associated with a biometric access identification (ID), the method comprising:
- capturing a biometric sample from the pre-processed caller using a biometric sensor;
- storing the biometric sample as the biometric access ID in association with:
  - a first number of calls that defines a number of calls made by the pre-processed caller, the first number of calls being preset to an initial value of zero;
  - a second number of calls that defines a maximum number of calls permitted by the pre-processed caller; and
  - a flag that is set to "active" or "inactive";
- receiving a request to process a call from the pre-processed caller;
- obtaining a fingerprint from the pre-processed caller;
- comparing the fingerprint to the biometric access ID; and
- processing the call in response to determining that the obtained fingerprint matches the biometric access ID, that the flag associated with the biometric access ID is set to "active," and that the first number of calls is less than the second number of calls.

16. The non-transitory computer program storage device of claim 15, the method further comprising setting the flag to "inactive" after the flag has been set to "active" for a predetermined amount of time.

17. The non-transitory computer program storage device of claim 15, the method further comprising:
- incrementing the first number of calls by one in response to processing the call;
- setting the flag to "inactive" after the first number of calls is equal to the second number of calls; and
- resetting the first number of calls to zero after a predetermined amount of time.

18. The non-transitory computer program storage device of claim 15, further comprising setting the flag to 'active' upon a first call attempt by the pre-processed caller after the biometric access ID been associated with the pre-processed caller.

19. The non-transitory computer program storage device of claim 15, the method further comprising:
- recording the call, wherein the call is stored in a call recording database; and
- associating the recorded call with the biometric access ID.

20. The non-transitory computer program storage device of claim 15, the method further comprising:
- determining whether the call is for a telephone number matches an entry in a list of phone numbers stored in a free call database; and
- processing the call when the telephone number matches the entry in the list of phone numbers.

* * * * *